June 5, 1956   J. J. ROHRBACH ET AL   2,748,654
SPECTACLE FRAME
Filed Sept. 24, 1952
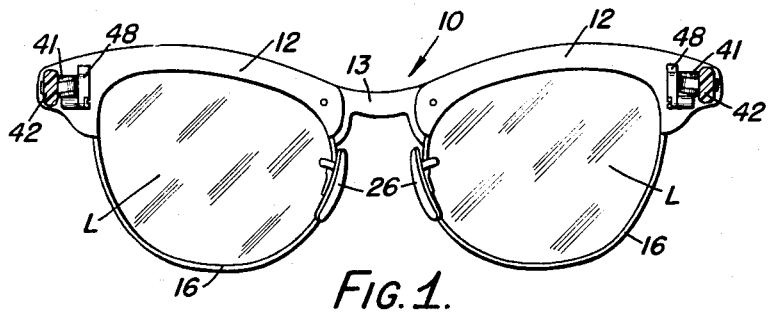
FIG. 1.
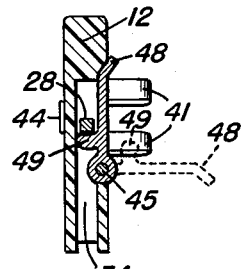
FIG. 4.
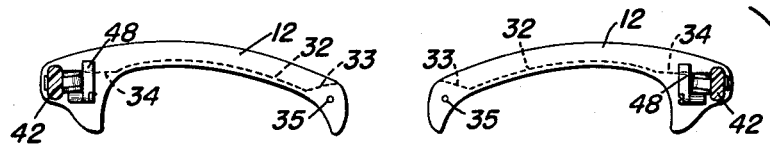
FIG. 2.
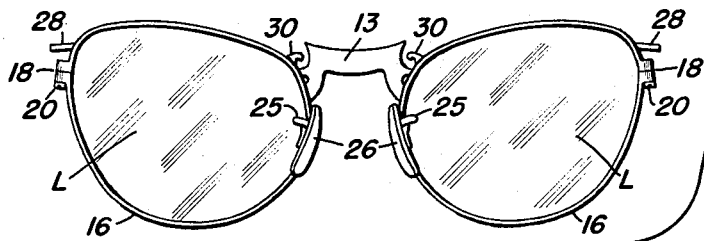
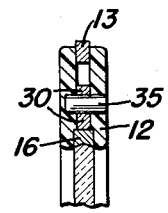
FIG. 7.
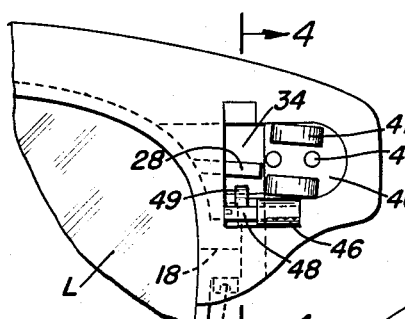
FIG. 3.
FIG. 5.
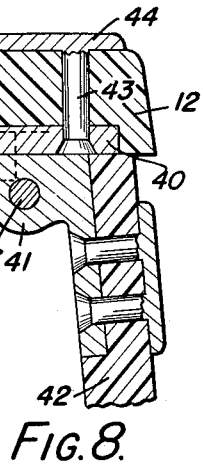
FIG. 8.
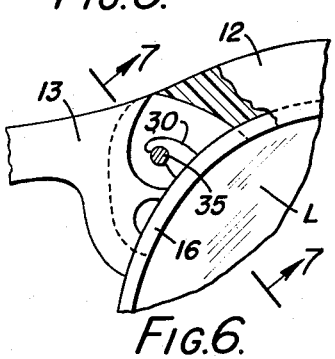
FIG. 6.
INVENTOR.
JOHN J. ROHRBACH
FRANCIS B. NEARY
BY
ATTORNEY

United States Patent Office 2,748,654
Patented June 5, 1956

2,748,654

SPECTACLE FRAME

John J. Rohrbach and Francis B. Neary, Rochester, N. Y., assignors to Shuron Optical Company, Inc., Geneva, N. Y., a corporation of New York Application September 24, 1952, Serial No. 311,245

10 Claims. (Cl. 88—41)

The present invention relates to spectacle frames and more particularly to combination metal and zylonite spectacle frames.

Spectacle frames are now made in a wide variety of designs and colors. Many persons desire spectacles of different colors and/or designs to harmonize with different dress accessories or different apparel or to suit different occasions or purposes. Heretofore, manufacturers of spectacle frames, opticians, and optometrists have had to maintain large inventories of various sizes, colors, designs, and shapes of spectacle frames in order to satisfy the requirements and tastes of the public. Moreover, since conventional spectacle frames are made so that the lenses are permanently fixed therein, any individual spectacle user, who has desired to have spectacle frames of different colors and/or designs, has had to buy the corresponding number of complete spectacles, lenses included. This is expensive because the cost of the lenses constitutes a large part of the cost of any spectacle.

Many suggestions have been made at various times for providing spectacle frames having removable lenses so that lenses could be removed from one frame by the wearer and inserted in another frame. None of these prior proposals have achieved commercial success because few people are good enough mechanics to be successful in assembling such delicate mechanisms as ophthalmic mountings. Professional practitioners, such as ophthalmologists and optometrists, moreover, do not look with favor on patients changing lenses from one frame to another. They fear that the patient may upset the fine correction required for satisfactory functioning of a carefully worked-out prescription to meet exact conditions found in refraction of an individual patient's eyes. They fear that the corrective lenses will not function as they are supposed to, with consequent discomfort to the patient, or in extreme cases, perhaps actual damage to the patient's vision.

Furthermore such spectacle frames as have heretofore been proposed for the purpose are apt to become worn so that a lens may become optically displaced or drop out, and be broken. In some cases, the proposed frame construction has been fragile, the design embodying such small and delicate working parts that the overall construction will not stand up under the comparatively rough handling to which optical wear is subjected, to say nothing of the additional strain on the working parts which necessarily results from continuous interchange of the lenses. In many instances, moreover, the parts that must be manipulated in order to effect interchange of the lenses have been so small that anyone, who needs to wear glasses, would have difficulty in interchanging the lenses without wearing his or her glasses, which obviously would be an impossibility during the interchange of the lenses.

One object of the invention is to provide a spectacle frame so constructed that a single pair of lenses may be interchanged in a number of different frames made in different colors so that a person can select a frame of a color and design to harmonize with a particular costume or to suit a particular occasion without the expense of purchasing a variety of frames complete with lenses.

Another object of the invention is to provide a spectacle frame construction, which will enable anyone, to use interchangeably different sets of lenses, for instance, clear lenses and sun glasses, with a given frame.

A further object of the invention is to provide spectacle frames with removable lenses in which means is provided to insure that the axes of the lenses cannot be turned from correct position when changing from one frame to another.

Another object of the invention is to provide a spectacle frame of the type described in which the decorative portion may be made of plastic or other non-metallic material while the lense holder itself is made of metal, and in which the lens holder may be so mounted removably in the plastic part of the frame as to hold the lens firmly and securely in correct optical position.

Another object of the invention is to provide a spectacle frame construction for interchangeable lenses which is simple enough for a person, who cannot see well without glasses, to make a change of lenses from one spectacle frame to another readily by sense of touch in the dark.

Another object of the invention is to provide a spectacle frame mounting for interchangeable lenses in which the lenses are mounted in protective rims to limit possibility of breakage if the lenses are dropped while the owner is changing them from one frame to another.

A further object of the invention is to provide a spectacle construction of the type described in which the lenses themselves are removably mounted in holders which are removably mountable in the frames so that not only may a single pair of lenses be transferred from frame to frame, but the lenses themselves may be changed as, for instance, when obsoleted, without obsoleting the frames themselves.

Another object of the invention is to provide a spectacle frame construction in which the lenses are mounted in a metallic chassis to which are removably attachable non-metallic semi-rims so that differently colored or differently designed semi-rims can be secured at will to the chassis to change at will the frame appearance.

Another object of the invention is to afford a spectacle frame construction that is in every way practical and that can be manufactured economically so as to permit the user of a metal spectacle frame to have available as many ornamental frames as desired, any of which can be attached at will selectively to the metal frame.

A still further object of the invention is to provide a structure of the type described in which the lenses and metal frame of the spectacle are securely and firmly held in the ornamental portions of the frame, while permitting the ornamental portions to be attached or removed readily from the metal frame, and in such manner as not to interfere with the proper functioning of the lenses for purposes of vision.

Another object of the invention is to provide a spectacle frame of the character described having improved means for securing the non-metallic parts to the metallic parts that will facilitate change of lensses from one frame to another.

Still another object of the invention is to provide an improved spectacle frame of the type described which will be durable in construction and efficient in operation.

Other objects of the invention will be apparent hereinafter from the specification and from the recital of the appended claims.

In the drawings:

Fig. 1 is a rear elevation, with the temples broken away, of a spectacle frame made according to one embodiment of this invention;

Fig. 2 is an exploded view showing the semi-rims of this frame separated from the metal chassis which carries the lenses;

Fig. 3 is a fragmentary rear view on an enlarged scale showing a detail of the structure of the means for removably connecting the metal chassis at one of its temporal sides with one of the plastic semi-rims, this view showing the retaining latch in disengaged position;

Fig. 4 is a section on the line 4—4 of Fig. 3, looking in the direction of the arrows, but showing the latch in full lines in operative position and in dotted lines in disengaged position;

Fig. 5 is a fragmentary perspective view looking at the back of one of the plastic semi-rims, showing the mounting of the latch thereon;

Fig. 6 is a fragmentary view on an enlarged scale, partially broken away, showing the means for connecting one of the semi-rims at its nasal side to the metal chassis;

Fig. 7 is a section on the line 7—7 of Fig. 6 looking in the direction of the arrows; and Fig. 8 is a fragmentary transverse section through the chassis and a semi-rim at the temporal end thereof and showing also fragmentarily one of the temples of the spectacle, the section being taken approximately at right angles to the section of Fig. 4.

Referring now to the drawings by numerals of reference, 10 denotes generally the spectacle mounting. This mounting includes two semi-rims 12, a bridge 13, and two lens holders or eyewires 16.

The eyewires hold the lenses L of the spectacles. Each is made of a suitable metal, for instance, gold or gold-filled, and is shaped to encircle and enclose one of the lenses L. Each eyewire is split, as denoted at 18 (Fig. 2), so that it may be opened to permit insertion into it or removal from it of a lens. The lenses are held in the eyewires by threading up on the screws 20 that secure abutting portions of the eyewires together. The eyewires are soldered or otherwise secured to the bridge 13, which is made of gold or other metal, so that in effect the eyewires and the bridge are integral with one another and constitute a metal chassis holding securely a pair of lenses.

Each of the eyewires has an arm 25 soldered or otherwise secured to it which carries a conventional nasal pad 26. Each eyewire also has a locking pin 28 soldered or otherwise secured to it at its temporal side.

Attached to the eyewires, as by soldering, are two hooks 30 which extend toward each other and toward the body portion of the bridge 13.

Each semi-rim is grooved in its bottom face, as denoted at 32 (Figs. 2 and 5) to receive and to conceal the upper reach of the associated eyewire. Each semi-rim is also grooved along its nasal edge, as denoted at 33, to straddle and conceal the adjacent portion of the bridge. Each semi-rim is further recessed at its temporal end, as denoted at 34, to receive one of the locking pins 28.

Secured in each semi-rim 12 to extend transversely of the groove 33 thereof is a pin 35. The hooks 30 are adapted to engage over the pins 35 of the semi-rims to secure the semi-rims at their nasal ends detachably to the metal chassis comprising the bridge and the eyewires.

Each semi-rim 12 is grooved on its back face adjacent its temporal edge to receive a hinge plate 40 (Figs. 3, 5 and 8). Each hinge plate 40 is formed on its rear face with two parallel rearwardly projecting ears 41 which are drilled for the hinge pin 47 by means of which the plate 40 is hingedly connected with that part 46 of the hinge to which the associated temple or bow 42 (Fig. 1) of the spectacle is fastened. Each hinge plate may be secured to its semi-rim by rivets 43 that are integral with the decorative shield 44 located against the front face of the semi-rim. The rivets 43 pass through the plastic semi-rims 12, and are anchored, as shown, in the hinge plate 40, so that none of the strains on the hinge are transmitted to the plastic of the semi-rims. The temples 42 are secured in similar fashion to the hinge plate 46, as indicated in Fig. 8.

Mounted on each hinge plate 40 by means of a pin 45 that threads into a tube 46 that is soldered to the hinge plate is a latch member 48. Each latch member is formed with a latch hook 49 on its front side that is adapted to engage under the locking pin 28 of the associated eyewire when the latch member is rocked from the dotted line position shown in Fig. 4 to the full line position of that figure.

In assembling the spectacle, the lenses are inserted in the two eyewires 16. Then the screws 20 are threaded up to secure the lenses in the eyewires. Then the pin 35 of one of the semi-rims 12 is engaged under one of the hooks 30 of the bridge, and the semi-rim is rocked down to seat the upper reach of the associated eyewire in the groove 32 of the semi-rim and to seat the lug 28 in the enlarged portion 34 of this groove. Then the associated latch 48 is rocked upwardly from the dotted line position of Fig. 4 to the full line position of that figure to engage it under the locking pin 28 of the eyewire, securing the semi-rim to the eyewire and bridge. In similar manner the other semi-rim is secured to the other eyewire at the opposite side of the bridge.

Because the latch hook 49 has a curved upper surface, as clearly shown in Fig. 4, it will wedge itself into engagement with the pin 28; and if at any time the latch becomes loose, the pin can be bent slightly to insure firm engagement of the latch with the pin.

The latch is bent slightly rearwardly at its upper end so that the user of the spectacle can readily grasp the latch with a finger and move the latch to disengaged position in order to permit removal of a semi-rim from the spectacle. After the latch is disengaged, all that it is necessary to do is to rock the semi-rim upwardly and disengage pin 35 from hook 30.

From the above description, it will be seen that any user of eyeglasses can with mountings constructed according to the present invention readily change a set of semi-rims of one color for a set of another color, and can just as readily change a set of semi-rims from one pair of lens mounts to another, as, for instance, from a chassis carrying clear lenses to a chassis carrying sun or dark glasses. Because the lenses remain in the lens mounts during the change of semi-rims, there is no danger of the user upsetting the fine correction required for satisfactory functioning of the lenses. Because the lenses are mounted in a metal chassis, the mounting is stable. Because the semi-rims are held on the mountings by latches that are readily operable manually it takes but an instant to change semi-rims from one mounting to another or to take off one set of semi-rims from a mounting and replace the set with another.

Thus with the present invention, a lady can change the color of her spectacles to suit the color of her dress by simply taking off one set of semi-rims and replacing them with a set of a suitable color. For evening wear, the lady can use a more elaborate set of semi-rims than for workday use. Furthermore, a person can purchase two mountings, one for clear lenses and another for sunglasses, for instance, and change semi-rims from one mounting to another to suit his or her pleasure and convenience. The latch can be manipulated in the dark by any person. It is not required to be wearing glasses in order to change semi-rims on a chassis. A person does not have to be a mechanic to remove a set of semi-rims from a chassis and assemble another set thereon. The mounting is foolproof and simple enough in operation so that a person who cannot see well without glasses can make a change of semi-rims readily solely by the sense of touch. The metal chassis insures that the axes of the lenses cannot be turned from the correct position in the frame. The supporting chassis limit possibility of breakage of the lenses should they be dropped during interchange. There are no parts that will get out of order. No tool whatsoever is required in shifting a set of semi-rims from one chassis to another or in changing one set of semi-rims for another.

Instead of pivoting the latch members at the lower sides of the temple hinges, they might be pivoted on the upper side of the temple hinges to swing downwardly to locked position and upwardly to released position, the latch being mounted on top of the hinge assembly. Other modifications of the invention will suggest themselves to those skilled in the art.

While the invention has been described, then, in connection with one embodiment thereof, it will be understood that it is capable of further modification, and this application is intended to cover any variations, uses, or adaptations of the invention following, in general, the principles of the invention and including such departures from the present disclosure as come within known or customary practice in the art to which the invention pertains and as may be applied to the essential features hereinbefore set forth and as fall within the scope of the invention or the limits of the appended claims.

Having thus described our invention, what we claim is:

1. A spectacle mounting comprising a pair of spaced metallic lens holders for holding the lenses of a spectacle, a metallic bridge rigidly secured to said lens holders at the nasal sides thereof, said lens holders and bridge constituting a lens-holding chassis, a pair of separate, spaced, non-metallic semi-rim members, each semi-rim member being grooved to receive and to partially encircle the associated lens holder and to overlie the front top edge of the associated lens holder, each semi-rim member being slotted at its nasal end also to straddle a portion of said bridge, each semi-rim member having a temple hinge plate secured at its rear side to its temporal end which has a portion overlying its groove, a temple pivotally connected to each hinge plate, means for detachably securing each semi-rim member at its nasal end to said bridge, and means for detachably securing each semi-rim member at its temporal end to the lens holder with which the semi-rim is associated, each of said securing means comprising a pair of cooperating members, one of which is fastened to a semi-rim member and the other of which is fastened to said chassis, one pair of cooperating members comprising a hook and a pin with which the hook is detachably engageable and the other pair of cooperating members comprising a movable latch and a pin with which said latch is engageable each of said latches being movably displaceable to release its pin, whereby said semi-rim members are demountably secured to said chassis, and each semi-rim is separately removable from the chassis in a single assembly with its associated temple by disengaging its latch from the cooperating pin and rocking the semi-rim member to disengage the hook associated therewith from the pin associated with that hook.

2. A spectacle mounting comprising a pair of spaced metallic lens holders for holding the lenses of a spectacle, a metallic bridge rigidly secured to said lens holders at the nasal sides thereof, said lens holders and bridge constituting a lens-holdering chassis, a pair of separate spaced, non-metallic semi-rim members, each semi-rim member being grooved to partially encircle the associated lens holder and being grooved at its nasal end to straddle a portion of said bridge, means for detachably securing each semi-rim member at its nasal end to said chassis comprising a pin carried by each semi-rim member adjacent the nasal end thereof, and a hook carried by the chassis for detachably engaging said pin, and means for detachably securing each semi-rim member at its temporal end to the lens holder with which the semi-rim is associated, comprising a hinge member secured adjacent the temporal end of each semi-rim member to connect a temple hingedly thereto, a movable latch, and a pin with which said latch is engageable, one of the two last-named parts being carried by each hinge member and the other of the two last-named parts being carried by the associated lens holder at the temporal side thereof.

3. A spectacle mounting comprising a metallic chassis including a pair of metallic lens holders for holding the lenses of a spectacle, and a metallic bridge rigidly secured to said lens holders at the nasal sides thereof, a pair of separate, spaced non-metallic seim-rim members, each semi-rim member being grooved to receive and to partially encircle one of the lens holders and to overlie the front top edge of the associated lens holder, each semi-rim member being slotted at its nasal end also to straddle a portion of said bridge, each semi-rim member having a temple hinge plate secured at its rear side to its temporal end which has a portion overlying its groove, a temple pivotally connected to each hinge plate, and means for detachably securing each semi-rim member to said chassis, each said securing means comprising two pairs of cooperating members, one member of each pair being secured to said chassis and the other member of each pair being secured to a semi-rim member, one pair of cooperating members comprising a pin and a pivoted latch member detachably engageable with said pin, and the other pair of cooperating members comprising a pin and a hook detachably engageable therewith, one of said pins being located at the nasal end of the assembled semi-rim member and chassis and the other of said pins being located at the temporal end of the assembled semi-rim member and chassis whereby said semi-rim members are demountably secured to said chassis and each semi-rim member is separately removable therefrom in a single assembly with its associated temple by disengaging the latch member associated with said semi-rim member from the associated pin and by rocking the semi-rim member so as to disengage the hook associated therewith from the pin associated with that hook.

4. A spectacle mounting comprising a metallic chassis including a pair of metalic lens holders for holding the lenses of a spectacle, and a metallic bridge rigidly secured to said lens holders at the nasal sides thereof, a pair of spaced non-metallic semi-rim members, each semi-rim member partially encircling one of the lens holders, means detachably securing the nasal end of each semi-rim member to said chassis, a hinge member secured to the temporal end of each semi-rim member to hingedly connect a temple thereto, and means for detachably connecting the temporal sides of the chassis to each semi-rim member comprising pins carried by the chassis at its temporal sides, and a latch movably mounted on each hinge member to be engaged with one of said pins.

5. A spectacle mounting comprising a metallic chassis including a pair of metallic lens holders for holding the lenses of a spectacle, and a metallic bridge rigidly secured to said lens holders at the nasal sides thereof, a pair of spaced non-metallic semi-rim members, each semi-rim member partially encircling one of the lens holders, means detachably securing the nasal end of each semi-rim member to said chassis, a hinge member secured to the temporal end of each semi-rim member to hingedly connect a temple thereto, and means for detachably connecting the temporal sides of the chassis to each semi-rim member comprising pins carried by the chassis at its temporal sides, and a latch pivotally mounted on each hinge member to be engaged with one of said pins.

6. A spectacle mounting comprising a metallic chassis including a pair of metallic lens holders for holding the lenses of a spectacle, and a metallic bridge rigidly secured to said lens holders at the nasal sides thereof, a pair of spaced non-metallic semi-rim members, each semi-rim member partially encircling one of the lens holders, means detachably securing the nasal end of each semi-rim member to said chassis, a hinge member secured to the temporal end of each semi-rim member to hingedly connect a temple thereto, and means for detachably connecting the temporal sides of the chassis to each semi-rim member comprising pins carried by the chassis at its temporal sides, and a latch pivotally mounted on each hinge member to be engaged with one of said pins, said latch having a cam-shaped hook portion adapted to engage said pin, and said pin being bendable to adjust the tension on the pin when it is engaged by said latch.

7. A spectacle mounting comprising a metallic chassis including a pair of metallic lens holders for holding the lenses of the spectacle, and a metallic bridge rigidly secured to said lens holders at the nasal sides thereof, a pair of spaced non-metallic semi-rim members, each semi-rim member partially encircling one of the lens holders, means detachably securing the nasal end of each semi-rim member to said chassis comprising a pin carried by the semi-rim member adjacent the nasal end thereof, and a hook carried by said chassis for detachably engaging said pin, a hinge member secured adjacent the temporal end of each semi-rim member to connect a temple hingedly thereto, and means for detachably connecting the semi-rim members at their temporal ends to said chassis comprising a pair of pins carried by the chassis at the temporal sides thereof, and a latch pivotally mounted on each hinge member, and adapted to detachably engage one of the last-named pins, each latch having a cam-shaped hook portion adapted to engage the associated pin, and each of the last-named pins being bendable to adjust the tension on the latch when the latch is in engaged position.

8. A spectacle mounting comprising a metallic chassis including a pair of metallic lens holders for holding the lenses of the spectacle, and a metallic bridge rigidly secured to said lens holders at the nasal sides thereof, a pair of spaced non-metallic semi-rim members, each semi-rim member partially encircling one of the lens holders, means detachably securing the nasal end of each semi-rim member to said chassis comprising a pin carried by the semi-rim member adjacent the nasal end thereof, and a hook carried by said chassis for detachably engaging said pin, a hinge member secured adjacent the temporal end of each semi-rim member to connect a temple hingedly thereto, and means for detachably connecting the semi-rim members at their temporal ends to said chassis comprising a latch pivotaly mounted on each hinge member, and a pair of members carried by the chassis at the temporal sides thereof and adapted to be detachably engaged by the latches.

9. A spectacle mounting comprising a metallic chassis including a pair of metallic lens holders for holding the lenses of the spectacle, and a metallic bridge rigidly secured to said lens holders at the nasal sides thereof, a pair of spaced non-metallic semi-rim members, each semi-rim member partially encircling one of the lens holders, means detachably securing the nasal end of each semi-rim member to said chassis comprising a pin carried by the semi-rim member adjacent the nasal end thereof, and a hook carried by the chassis for detachably engaging said pin, and means for detachably connecting each semi-rim member at its temporal end to said chassis comprising a hinge member secured adjacent the temporal end of each semi-rim member to connect a temple hingedly thereto, a pin, and a pivotal latch adapted to engage said pin, one of the two last-named parts being mounted on the hinge member and the other of the last-named parts being mounted on the chassis at a temporal side thereof.

10. A spectacle mounting comprising a metatllic chassis including a pair of metallic lens holders for holding the lenses of the spectacle, and a metallic bridge rigidly secured to said lens holders at the nasal sides thereof, a pair of spaced non-metallic semi-rim members, each semi-rim member partially encircling one of the lens holders, means detachably securing the nasal end of each semi-rim member to said chassis comprising a pin carried by the semi-rim member adjacent the nasal end thereof, and a hook carried by the chassis for detachably engaging said pin, and means for detachably connecting each semi-rim member at its temporal end to said chassis comprising a hinge member secured adjacent the temporal end of each semi-rim member to connect a temple hingedly thereto, a pin, and a pivotal latch adapted to engage said pin, one of the two last-named parts being mounted on the hinge member and the other of the two last-named parts being mounted on the chassis at a temporal side thereof, said latch having a cam-shaped hook portion to engage the last-named pin, and said last-named pin being bendable to adjust the tension of grip of the latch on said last-named pin.

References Cited in the file of this patent

UNITED STATES PATENTS

| | | |
|---|---|---|
| 2,482,195 | Martin | Sept. 20, 1949 |
| 2,495,508 | Cleaver | Jan. 24, 1950 |
| 2,577,380 | Stegeman | Dec. 4, 1951 |
| 2,627,783 | Splaine | Feb. 10, 1953 |